United States Patent
Kiyono et al.

(10) Patent No.: US 7,405,353 B2
(45) Date of Patent: Jul. 29, 2008

(54) INPUT DEVICE, GAME MACHINE, SIMULATED PERCUSSION INSTRUMENT, AND PROGRAM

(75) Inventors: Tsutomu Kiyono, Kawasaki (JP); Masatoshi Takai, Nakano (JP); Masuya Oishi, Yokohama (JP)

(73) Assignee: Namco Bandai Games Inc., Tokyo (JP)

( * ) Notice: Subject to any disclaimer, the term of this patent is extended or adjusted under 35 U.S.C. 154(b) by 139 days.

(21) Appl. No.: 10/632,809

(22) Filed: Aug. 4, 2003

(65) Prior Publication Data

US 2004/0159223 A1   Aug. 19, 2004

(30) Foreign Application Priority Data

Aug. 9, 2002   (JP)   ............... 2002-233261

(51) Int. Cl.
*G10H 1/00*   (2006.01)

(52) U.S. Cl. ........................ 84/600; 84/411 R (58) Field of Classification Search ............ 84/600, 84/609, 649, 723–725, 730, 104, 411 R
See application file for complete search history.

(56) References Cited

U.S. PATENT DOCUMENTS

| | | | | |
|---|---|---|---|---|
| 4,852,443 A * | 8/1989 | Duncan et al. | ................ | 84/733 |
| 5,438,529 A * | 8/1995 | Rosenberg et al. | .......... | 708/131 |
| 6,031,176 A | 2/2000 | Tanaka | ........................ | 84/735 |
| 6,342,665 B1 * | 1/2002 | Okita et al. | ................... | 84/609 |
| 6,499,741 B2 * | 12/2002 | Yamazaki et al. | .......... | 273/108 |
| 6,601,436 B1 | 8/2003 | Senda et al. | ................ | 73/12.09 |
| 6,632,898 B1 * | 10/2003 | Canich | ........................ | 526/127 |
| 6,822,148 B2 * | 11/2004 | Yanase | ........................ | 84/422.1 |
| 2001/0034014 A1 * | 10/2001 | Nishimoto et al. | .......... | 434/247 |
| 2002/0025842 A1 | 2/2002 | Nobe et al. | .................... | 463/7 |
| 2003/0061932 A1 * | 4/2003 | Tanaka et al. | ................. | 84/734 |
| 2003/0188629 A1 * | 10/2003 | Suenaga | ....................... | 84/723 |
| 2004/0014513 A1 * | 1/2004 | Boon | ............................. | 463/8 |
| 2004/0083873 A1 * | 5/2004 | Yoshino et al. | ............... | 84/107 |

FOREIGN PATENT DOCUMENTS

| | | |
|---|---|---|
| EP | 1 029 565 A3 | 8/2000 |
| JP | 01167797 A * | 7/1989 |
| JP | U 7-10798 | 2/1995 |

(Continued)

*Primary Examiner*—Lincoln Donovan
*Assistant Examiner*—Jianchun Qin
(74) *Attorney, Agent, or Firm*—Oliff & Berridge, PLC (57) ABSTRACT

A high-precision input device which has less delay in signal transmission and can sense a plurality of input signals is provided. This input device includes a planar first input area and a second input area annularly formed around the periphery of the first input area. The input device outputs different signals when beating inputs are applied to the input areas. The surface of the first input area is almost entirely covered by a sheet-like first input sensor that is divided into left-side and right-side sensors. A plurality of second input sensors are arranged annularly in the second input area and they are connected to a conductive section. The conductive section is connected to a plurality of bypass members provided for the second input sensors so that the input device is provided with a plurality of paths for transmitting signals from each of the second input sensors.

17 Claims, 7 Drawing Sheets

FOREIGN PATENT DOCUMENTS

| | | |
|---|---|---|
| JP | A 09-198040 | 7/1997 |
| JP | B2 2944042 | 6/1999 |
| JP | 2000347668 A * | 12/2000 |
| JP | A 2001-234397 | 8/2001 |
| JP | A 2001-255871 | 9/2001 |
| JP | A 2001-276421 | 10/2001 |
| JP | 2002-351459 * | 6/2002 |
| JP | 2003-208157 | 7/2003 |

* cited by examiner

INPUT DEVICE, GAME MACHINE, SIMULATED PERCUSSION INSTRUMENT, AND PROGRAM

Japanese Patent Application No. 2002-233261 filed on Aug. 9, 2002 is hereby incorporated in its entirety.

BACKGROUND OF THE INVENTION

The present invention relates to an input device for beating input, game machine, simulated percussion instrument and program.

One electronic percussion instrument is described, for example, in Japanese Patent Publication No. 2944042.

This electronic percussion instrument includes a centrally located circular head portion and a beating area which is formed around the outer periphery thereof and which has a rim portion. Both the head and rim portions can be used for input.

The rim portion includes an annular-shaped resistant surface and electrodes connected to the opposite ends of the resistant surface. The rim portion is connected to a circuit board or the like through the electrodes.

However, the annular-shaped resistant surface will function as an electrical resistance, such that signal transfer time will be varied depending on the distance from the electrodes.

This raises a problem in that such an electronic percussion instrument cannot be used as an input device, for example, in a music game machine which is designed to evaluate the quick timing of input.

With such an electronic percussion instrument, the head portion includes only a single circular head sensor.

However, this raises another problem in that if one of two drum sticks is unconsciously left on the head portion, no input signal can be received even when the other drum stick is used to apply the beating input to the head sensor.

BRIEF SUMMARY OF THE INVENTION (1) One aspect of the present invention provides an input device which outputs a signal by applying a beating input to an annularly-formed input area, wherein the input area includes a plurality of input sensors branched from a conductive section which transmits a signal as a first transmission path, the conductive section being connected to at least one bypass member which is a second transmission path so that a plurality of paths for transmitting a signal from the input sensors are provided for the input device.

(2) Another aspect of the present invention provides an input device which outputs a signal by applying a beating input to a planar input area in a predetermined region, wherein the input area includes a sheet-like input sensor which is disposed over the almost entire surface of the input area, the input sensor being divided into a plurality of sections.

(3) A further aspect of the present invention provides an input device having a planar-shaped first input area in a predetermined region and a second input area annularly formed around a periphery of the first input area, the input device outputting different signals when beating inputs are applied to the first and second input areas, respectively, wherein the first input area includes a sheet-like first input sensor which is disposed over the almost entire surface of the first input area, the first input sensor being divided into a plurality of sections, and wherein the second input area includes a plurality of second input sensors branched from a conductive section which transmits a signal as a first transmission path, the conductive section being connected to at least one bypass member which is a second transmission path so that a plurality of paths for transmitting a signal from the second input sensors are provided for the input device.

(4) A still further aspect of the present invention provides a game machine for playing a percussion-instrument music game, the game machine including the above-mentioned input device.

(5) A yet further aspect of the present invention provides a simulated percussion instrument for performing a simulated percussion play, the simulated percussion instrument including the above-mentioned input device.

(6) An even further aspect of the present invention provides a program for playing a music game with a percussion instrument, wherein the game starts when an initially inputted beating operation signal is received as a start signal in a start acceptance state prior to starting the game.

DETAILED DESCRIPTION OF THE EMBODIMENT

An embodiment of the present invention will now be described with reference to the drawing.

Note that the embodiments described hereunder do not in any way limit the scope of the invention defined by the claims laid out herein. Note also that all of the elements of these embodiments should not be taken as essential requirements to the present invention.

(1) One embodiment of the present invention provides an input device which outputs a signal by applying a beating input to an annularly-formed input area, wherein the input area includes a plurality of input sensors branched from a conductive section which transmits a signal as a first transmission path, the conductive section being connected to at least one bypass member which is a second transmission path so that a plurality of paths for transmitting a signal from the input sensors are provided for the input device.

When the conductive section is connected to at least one bypass member to provide a plurality of paths for transmitting signals from the input sensors in the aforementioned manner, the signal transfer time can be wholly equalized from one another to ensure a substantially uniform signal transfer time. Thus, the input device can optimally be used for example, as an input device for a music game machine which is designed to evaluate the quick timing of input.

(2) Another embodiment of the present invention provides an input device which outputs a signal by applying a beating input to a planar input area in a predetermined region, wherein the input area includes a sheet-like input sensor which is disposed over the almost entire surface of the input area, the input sensor being divided into a plurality of sections.

When the sheet-like input sensor in the input area is divided into a plurality of sections, one drum stick can be used to input signals through one of the divided sections even if the other drum stick is unconsciously left on the other divided section, for example. If the input device is used in a game machine or a simulated percussion instrument, it can realize various different actions by a player.

(3) A further embodiment of the present invention provides an input device having a planar-shaped first input area in a predetermined region and a second input area annularly formed around a periphery of the first input area, the input device outputting different signals when beating inputs are applied to the first and second input areas, respectively, wherein the first input area includes a sheet-like first input sensor which is disposed over the almost entire surface of the first input area, the first input sensor being divided into a plurality of sections, and wherein the second input area includes a plurality of second input sensors branched from a conductive section which transmits a signal as a first transmission path, the conductive section being connected to at least one bypass member which is a second transmission path so that a plurality of paths for transmitting a signal from the second input sensors are provided for the input device.

When the sheet-like first input sensor in the first input area is divided into a plurality of sections, one drum stick can be used to input signals through one of the divided sections even if the other drum stick is unconsciously left on the other divided section, for example. If the input device is used in a game machine or a simulated percussion instrument, it can realize various different actions by a player.

When the conductive section in the second input area is connected to at least one bypass member to provide a plurality of paths for transmitting signals from the second input sensors, the signal transfer time can be wholly equalized from one another to ensure a substantially uniform signal transfer time. Thus, the input device can optimally be used, for example, as an input device for a music game machine which is designed to evaluate a quick timing of input.

(4) In these embodiments, when a boundary portion between the divided sections is beaten, it may be determined that the beating input is applied to any one of the sections.

In such an arrangement, an input signal can be sensed in each of the divided sections when the boundary portion between the divided sections is beaten. It is then determined that the beating input has been made in any one of the divided sections. As a result, only one output will be created by one beating input. Thus, one beating input can correspond to one output.

(5) Moreover, the sheet-like first input sensor in the first input area may be divided into two sections consisting of left-side and right-side sections, the input device having means for positioning the two sections at corresponding left-side and right-side locations.

In such an arrangement, for example, when two drum sticks held by both hands of an operator, respectively, are used for beating inputs to the first input area, the two sections consisting of the left and right sections can be surely positioned at the left and right side locations by the positioning means. Even if one of the drum sticks is used to apply one beating input while pressing the other drum stick against one of the left and right side sections, the beating input from the one drum stick can surely be caught as an input signal.

(6) A still further embodiment of the present invention provides a game machine for playing a percussion-instrument music game, the game machine including the above-mentioned input device.

(7) A yet further embodiment of the present invention provides a simulated percussion instrument for performing a simulated percussion play, the simulated percussion instrument including the above-mentioned input device.

In such a game machine and a simulated percussion instrument, even if a drum stick is continuously pressed by a player against one section in the first input area, the player can input an input signal from another section. This enables a player to realize various different actions.

Moreover, by provision of the second input area, a simulated percussion instrument having such a structure that eliminates any delay in signal transmission and a music game machine evaluating the timing of input can be realized.

(8) An even further embodiment of the present invention provides a program for playing a music game with a percussion instrument, wherein the game starts when an initially inputted beating operation signal is received as a start signal in a start acceptance state prior to starting the game.

Thus, the game can be started by the initially inputted beating operation signal without operating a start button to start the game. This can provide natural operational feeling.

FIGS. 1 to 6 illustrate a game machine according to one embodiment of the present invention.

Figure 1:
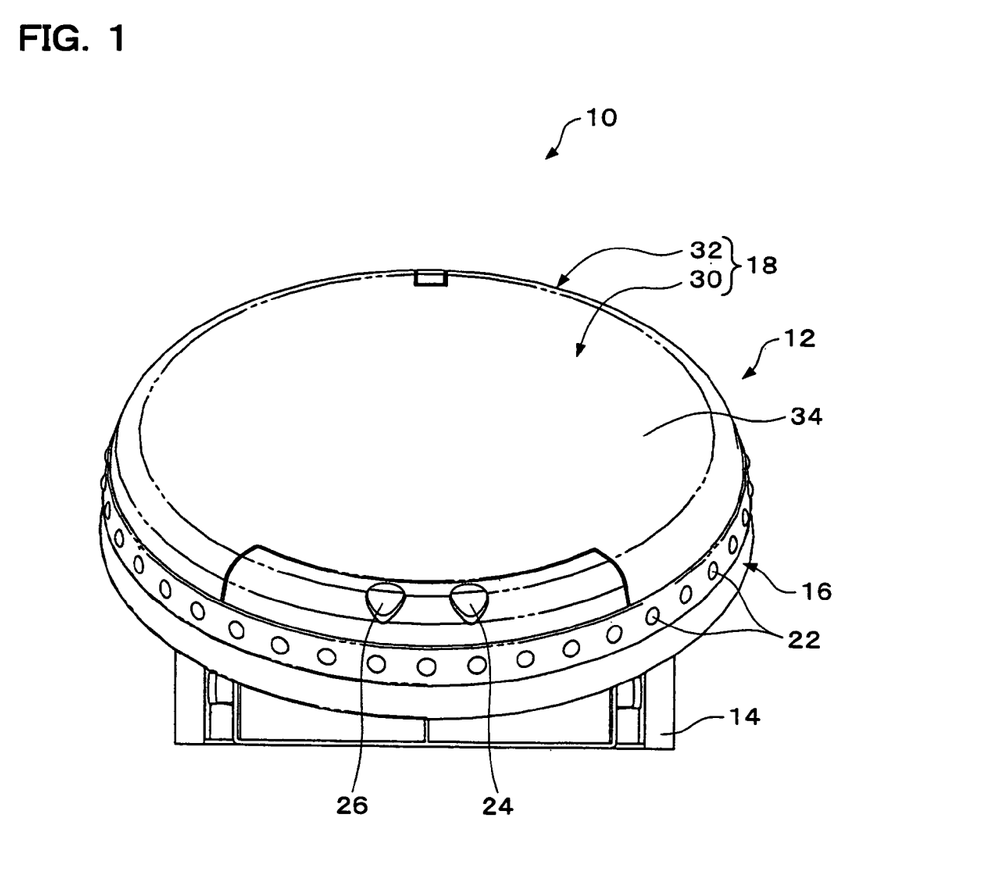
FIG. 1 is a front view of a game machine according to one embodiment of the present invention.
Figure 2:
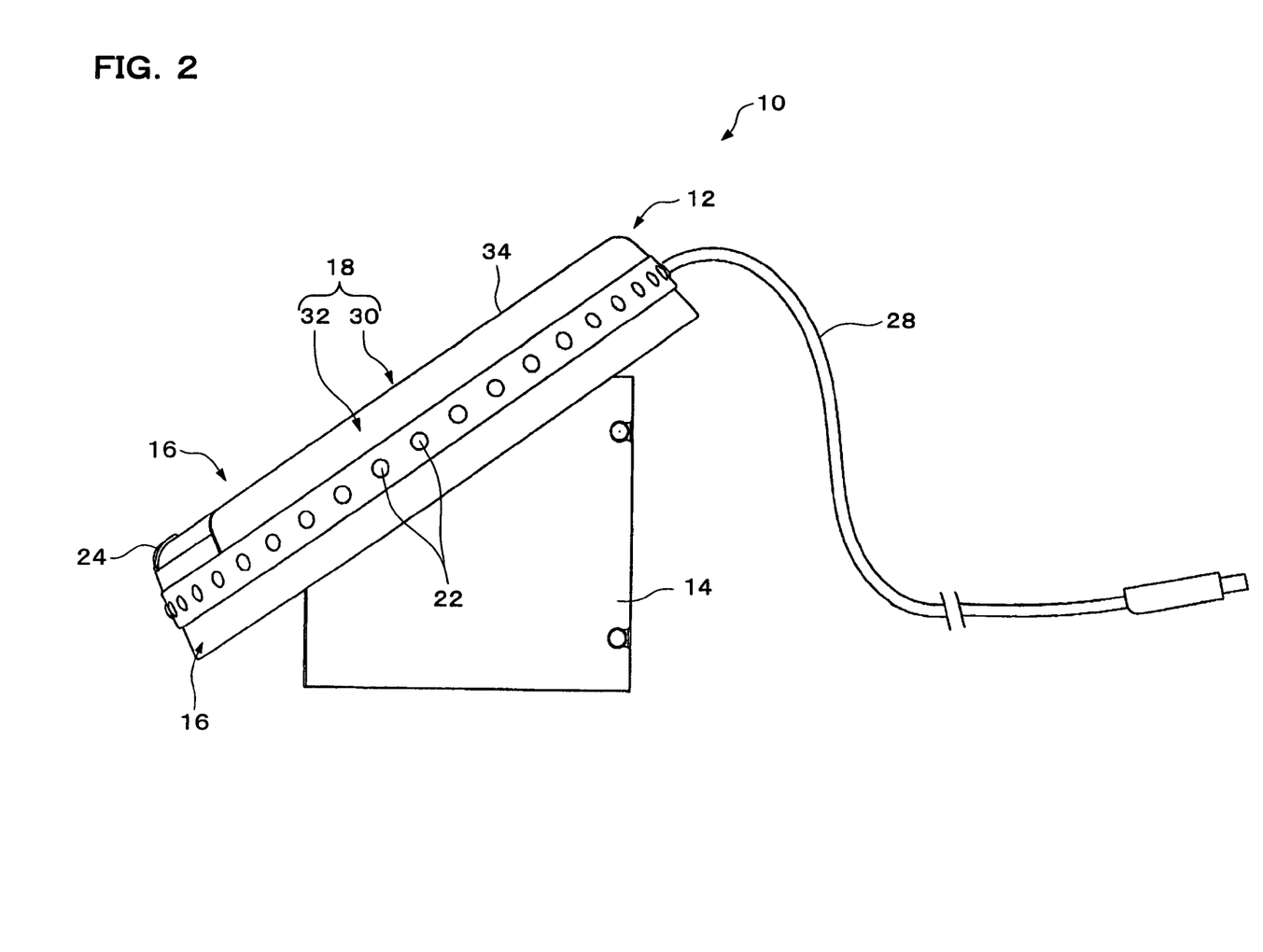
FIG. 2 is a side view of the game machine of FIG. 1.
Figure 3:
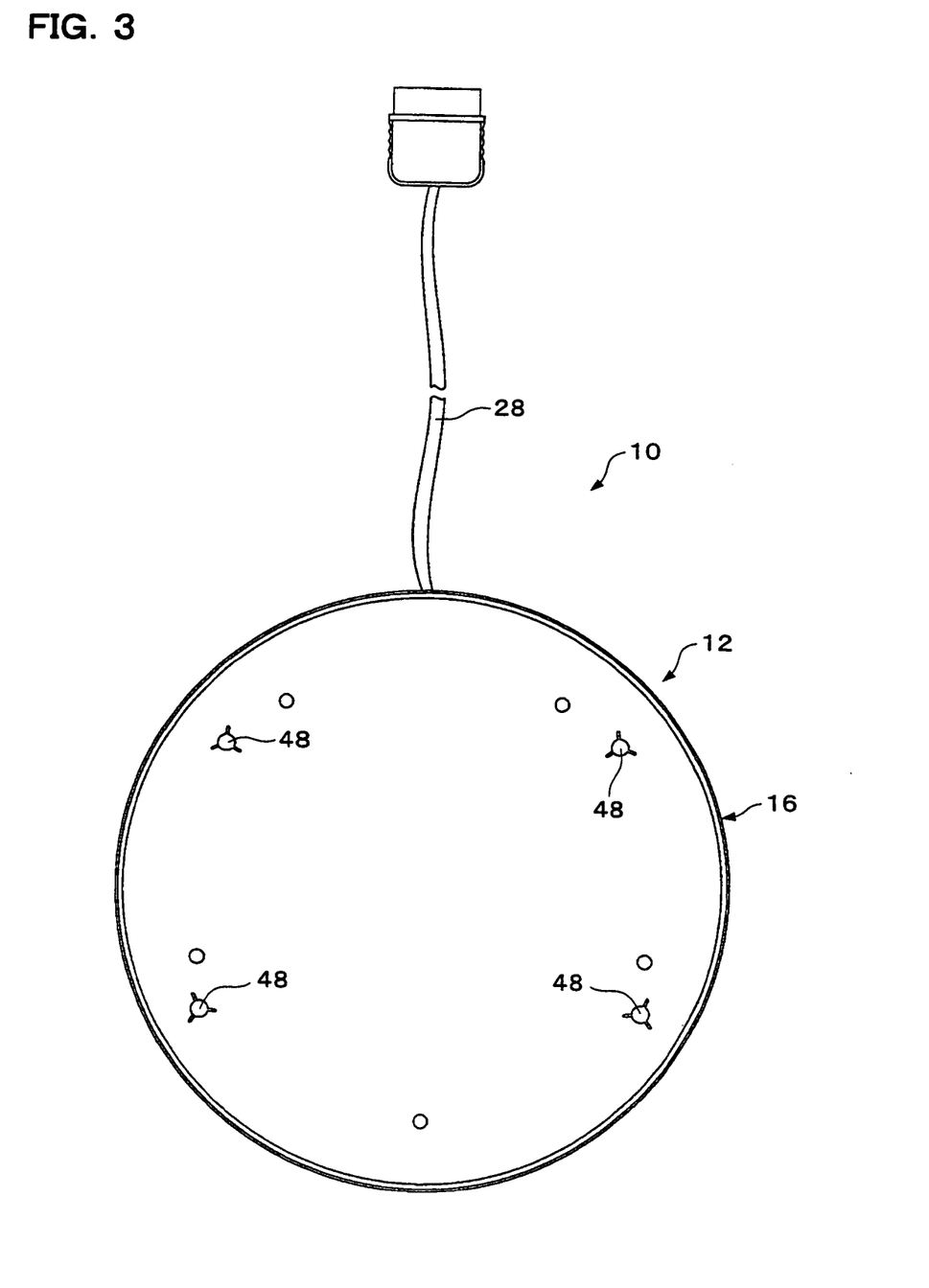
FIG. 3 is a back view of a drum body shown in FIGS. 1 and 2.

This game machine 10 is designed to play a percussion instrument music game particularly using a drum. As shown in FIGS. 1 and 2, the game machine 10 includes a drum body 12 imitating an actual drum and a support base 14 functioning as means for positioning the drum body 12.

The drum body 12 includes a housing 16 and an input device 18.

The housing 16 is of a substantially circular configuration imitating the actual drum and includes rivets 22 which are mounted around the peripheral side of the housing with a predetermined spacing.

In addition, a start button 24 and a select button 26 are arranged on the front side of the housing 16 that is to be faced to an operator during play. The housing 16 includes a circuit board (not shown) and a cord 28 extending from the rear side of the housing 16, the cord 28 is used for connecting with the main body of a game machine.

The input device 18 includes a first input area 30 and a second input area 32.

The first input area 30 is of a circular and planar configuration covering almost entire top surface of the housing 16 except the peripheral edge of the top surface of the housing 16.

Figure 4:
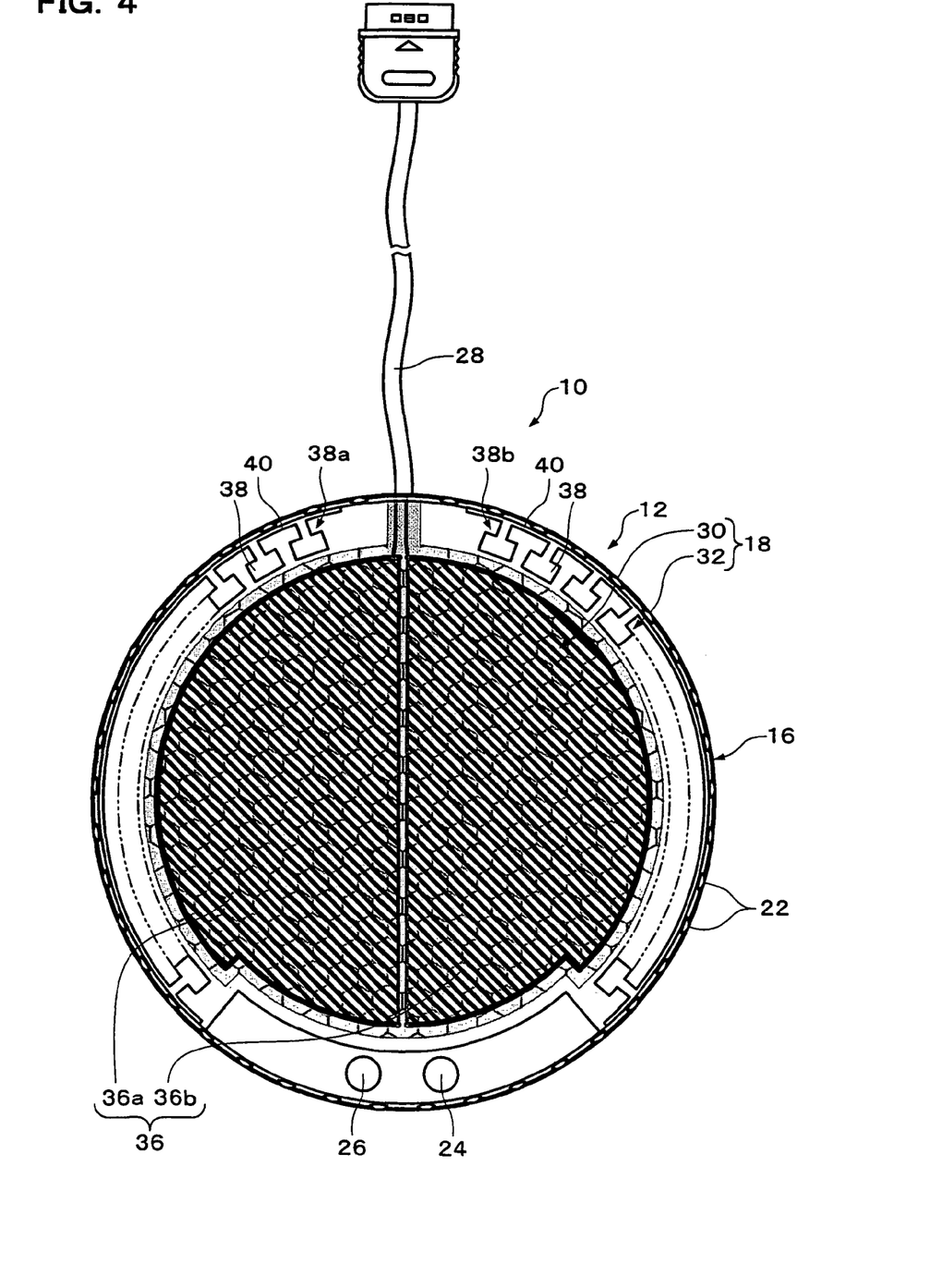
FIG. 4 is a plan view of the drum body according to this embodiment, the pads being removed.

The surface of this first input area 30 is covered with a pad 34. A sheet-like first input sensor 36 is located underside the pad 34 to cover almost entire region of the first input area 30 as shown in FIG. 4.

This first input sensor 36 is in the form of a membrane switch which includes two superimposed sheet members having printed contacts with an air-gap being formed therebetween.

This air-gap may be formed by inserting film spacers between the upper and lower sheet members or by forming dot-like spacers of resin material therebetween during the printing process.

In this embodiment, the dot-like spacers are taken to form the air-gap. Furthermore, auxiliary spacers of resin material each having a predetermined shape are bonded to the surface of the upper sheet member on which the dot-like spacers are to be printed.

Figure 7:
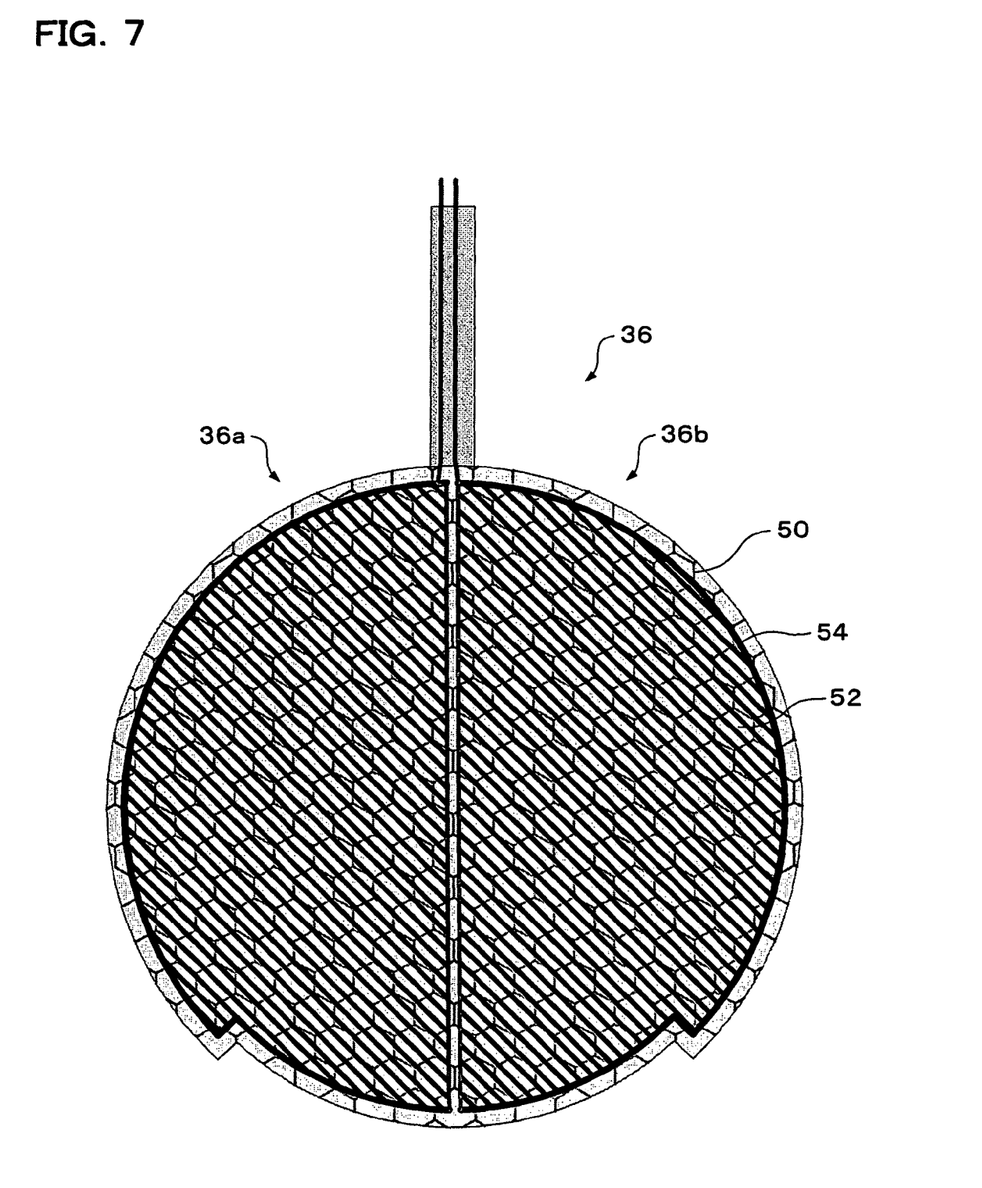
FIG. 7 is a plan view showing a sheet-like member to which a resin spacer in the first input sensor is adhered.

FIG. 7 shows a sheet member 52 to which an auxiliary spacer 50 is bonded.

The sheet member 52 includes printed contacts 54.

This auxiliary spacer 50 is wholly formed by continuously arranged hexagonal resin elements each of which has the thickness (height) of about 0.1 mm and the width of 0.5 mm.

However, the thickness and width of the hexagonal elements may be varied, if necessary. The shape of each of the continuous elements may be any of various other configurations such as other polygons and circle.

The provision of the auxiliary spacer is because the input sensor 36 can be beaten by a stronger force as in the actual drum, thereby creating collapse of the dot-like spacers or deformation of the sheet members so that the upper and lower sheet members will be brought into intimate contact with each other.

If the area of each sheet member is relatively large as in this embodiment, the upper and lower sheet members may be brought into intimate contact with each other due to the weight of the upper sheet member itself.

Thus, the larger area of the upper sheet member can be divided into smaller areas by the provision of the auxiliary spacer, thereby reducing, the influence of the upper sheet member itself due to its weight.

When a certain location on the first input area 30 is beaten by a drum stick, the first input sensor 36 inside the beaten portion is switched on to sense the input and the main body of the game machine generates a sound that would be heard when a leather part of an actual drum is beaten (for example "Bam").

Moreover, this first input sensor 36 is divided into a plurality of sections, more particularly into two sections consisting of left-side and right-side sections, to form left-side and right-side sensors 36a and 36b. Each of the first left-side and right-side input sensors 36a and 36b is independently connected with a circuit board within the housing 18 through a lead wire (now shown).

Therefore, for example, even if a drum stick is left on the left-side area and when the left-side first input sensor 36a is continuously switched on, the first right-side input sensor 36b can sense the input state by beating the right-side area with the other drum stick. This enables a player to perform various different actions.

The second input area 32 is annularly formed around the circumference of the first input area 30.

This second input area 32 includes a plurality of second input sensors 38 which are annularly arranged below the pad 34 with a predetermined spacing.

Figure 5:
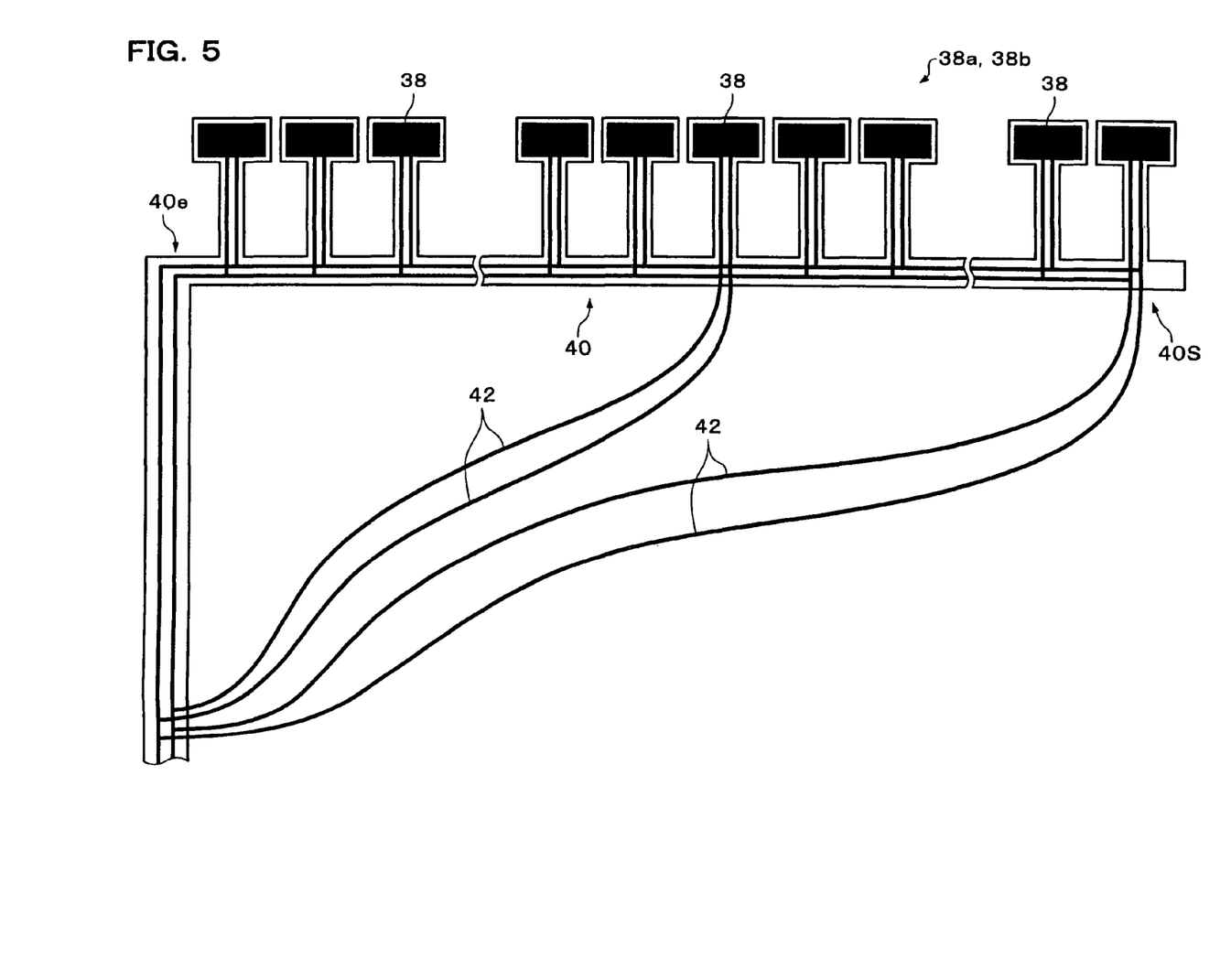
FIG. 5 illustrates a second input sensor.

Each of these second input sensors 38 is a sheet-like sensor as the first input sensor 36. The second input sensors 38 are connected with each other through a sheet-like conductive section 40 and divided into two groups of left-side and right-side second input sensors 38a and 38b.

This conductive section 40 is connected with a plurality of bypass members 42. Each of the bypass members 42 is provided for one or more second input sensors 38 and connected to an electrode leading to the circuit board within the housing 16, thereby a plurality of transmission paths from each of the second input sensors 38 are provided in the input device.

It is desirable to use a lead wire having a signal transmission resistance smaller than that of the conductive section 40 for each of these bypass members 42.

This feature aims to prevent a nearer part 40e and a farther part 40s to the circuit board from being created in the conductive section 40. Thus, the difference in signal transfer time can be eliminated and a substantially uniform signal transfer time from all the second input sensors 38 can be ensured, thereby quick timing of input can be evaluated.

When this second input sensor 38 is beaten by the drum stick, a sound that would be heard when a wooden part of an actual drum is beaten ("Clack", for example) is output.

In such a manner, the player hears a sound that would be heard when the leather part of an actual drum is beaten ("Bam", for example) by beating the second input area 30 with the drum stick and also a sound that would be heard when the woody part of an actual drum is beaten ("Clack", for example) by beating the second input area 32 with the drum stick. This can cause the player to experience a state as if he or she actually beats the drum.

Moreover, the first input area 30 is set to perform the same function as the start button 24. A program is incorporated such that under a start acceptance state prior to game start, the game machine can start the game by receiving a beating operation signal initially inputted into the first input area 30 as a start signal.

Therefore, the game can be started by a beating input after been ready for the beating without purposely operating the start button 24. Therefore, the input device can be operated with natural operational feeling without again holding the drum stick.

Similarly, the left-side and right-side second input sensors 38a and 38b are set to perform the same function as the select switch 26.

When the boundary between the left-side first input sensor 36a and the right-side first input sensor 36b is beaten by the drum stick, both the left-side and right-side first sensors 36a and 36b sense the input. However, the game machine is designed to output a sound as one input.

Even if a beating input is applied to the boundary between the left-side and right-side first sensors 36a and 36b, therefore, the beating input can be corresponded to the output with a ratio of one-to-one.

Figure 6:
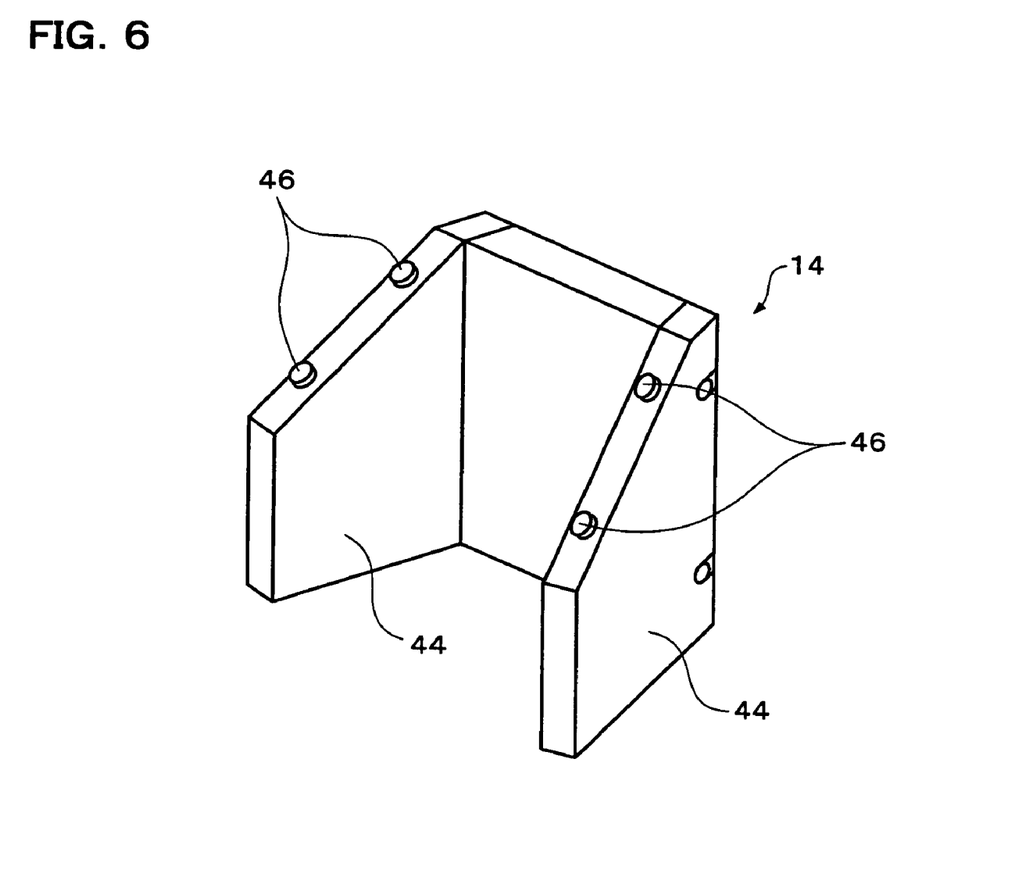
FIG. 6 is a perspective view of a support base.

The support base 14 supports the drum body 12 in its slanted position and has a C-shaped (channel) configuration which has two opposed sidewalls 44 with the top faces thereof being slanted in the forward and backward direction.

Moreover, the sidewalls 44 are spread apart from each other in the forward direction from the backward. The top face of each of the sidewalls 44 is formed with two protrusions 46 which are to be fitted into the corresponding engagement apertures 48 on the bottom surface of the housing 16.

Therefore, if the drum body 12 is supported on the support base 14 through engagement of the protrusions 46 into the engagement apertures 48, it is ensured that the left-side and right-side first input sensors 36a and 36b can be positioned at their left and right side locations.

Thus, even if a player holds two drum sticks with both hands, respectively, and one of the two drum sticks is used to apply a beating input to one of the left and right side areas while the other drum stick continuously being pressed against the other area, the applied beating input can surely be caught as an input signal.

The present invention is not limited to the above described embodiment, but may be carried out in any of various other forms within the spirit and scope of the invention.

For example, although the embodiment of the present invention has been described as to an input device having the first and second input areas, for example, it is not limited to such a configuration. The present invention may similarly be applied to an input device only having a single input area.

Although the embodiment of the invention has been described as to a game machine having an input device, the input device may be independently formed or the embodiment may be formed as a simulated percussion instrument rather than the game machine.

Furthermore, the first input area may be divided into three or more sections rather than two sections. As a result, more various types of input can be performed.

What is claimed is:

1. An input device which outputs a signal by applying a beating input to an input area formed on an annular peripheral portion of the input device,
   wherein a plurality of input sensors are located in the input area and branched from at least one conductive section which transmits a signal from the input sensors and serves as a first transmission path, the conductive section is connected to at least one bypass member that serves as at least one second transmission path different from the first transmission path, and the at least one bypass member is connected between different portions of the conductive section.

2. A game machine for playing a percussion-instrument music game, the game machine including an input device according to claim 1.

3. A simulated percussion instrument for performing a simulated percussion play, the simulated percussion instrument including an input device according to claim 1.

4. An input device according to claim 1, wherein
   the annular peripheral portion is divided into sides,
   the at least one conductive section comprises first and second conductive sections, the first and second conductive sections located at different sides of the annular peripheral portion,
   a first group of the plurality of input sensors branches from the first conductive section, and
   a second group of the plurality of input sensors branches from the second conductive section.

5. An input device having a planar-shaped first input area in a predetermined region and a second input area formed around a periphery of the first input area, the input device outputting different signals when beating inputs are applied to the first and second input areas, respectively,
   wherein the first input area includes a sheet-like first input sensor which is disposed over the almost entire surface of the first input area, the first input sensor being divided into a plurality of sections, and
   wherein the second input area includes a plurality of second input sensors branched from a conductive section which transmits a signal from the plurality of second input sensors and serves as a first transmission path, and the conductive section is connected to at least one bypass member that serves as a second transmission path so that a plurality of paths for transmitting the signal from the second input sensors are provided for the input device.

6. The input device according to claim 5,
   wherein when a boundary portion between the divided sections is beaten, it is determined that the beating input is applied to any one of the sections.

7. A game machine for playing a percussion-instrument music game, the game machine including an input device according to claim 6.

8. A simulated percussion instrument for performing a simulated percussion play, the simulated percussion instrument including an input device according to claim 6.

9. The input device according to claim 5,
   wherein the sheet-like first input sensor in the first input area is divided into two sections consisting of left-side and right-side sections, the input device having means for positioning the two sections at corresponding left-side and right-side locations.

10. A game machine for playing a percussion-instrument music game, the game machine including an input device according to claim 9.

11. A simulated percussion instrument for performing a simulated percussion play, the simulated percussion instrument including an input device according to claim 9.

12. A game machine for playing a percussion-instrument music game, the game machine including an input device according to claim 5.

13. A simulated percussion instrument for performing a simulated percussion play, the simulated percussion instrument including an input device according to claim 5.

14. A method for playing a music game with a percussion instrument, comprising:
   providing the percussion instrument that comprises a plurality of input sensors in an input area and branched from at least one conductive section which transmits a signal as a first transmission path, the conductive section being connected to at least one bypass member which is a second transmission path so that a plurality of paths for transmitting a signal from the input sensors are provided for the input device;
   detecting with the plurality of input sensors that the percussion instrument is beaten in a game start acceptance state prior to starting the game;
   outputting a percussion instrument signal as a game start signal based on the detection; and
   starting the game when the percussion instrument signal is received.

15. The method according to claim 14, further comprising:
   providing a button that outputs a game start signal; and
   outputting the game start signal when the button is operated in the game start acceptance state,
   wherein the game starts when at least one of the percussion instrument signal and the game start signal is received.

16. The method of according to claim 14, wherein the percussion instrument is beaten by a drum stick to start the game.

17. A computer-usable program embodied on an information storage medium, comprising:
   an instruction for performing the method according to claim 14.

* * * * *